Figure 1:
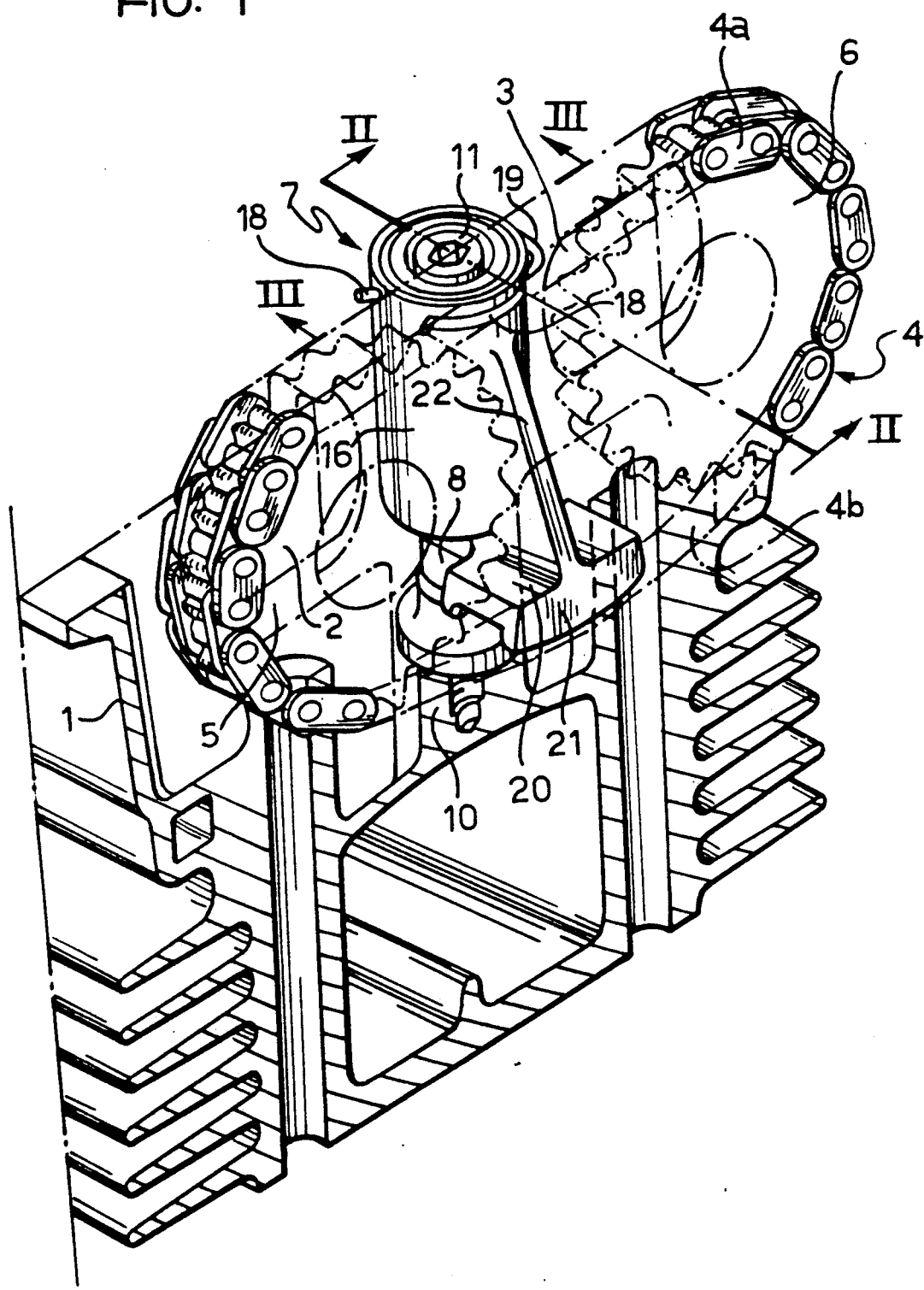

United States Patent [19]

Ferrazzi

[11] Patent Number: 5,088,457
[45] Date of Patent: Feb. 18, 1992

[54] INTERNAL COMBUSTION ENGINE WITH A TENSIONER FOR THE TRANSMISSION CHAIN BETWEEN TWO OVERHEAD CAMSHAFTS

[75] Inventor: Francesco Ferrazzi, Torino, Italy

[73] Assignee: Fiat Auto SPA, Torino, Italy

[21] Appl. No.: 688,397

[22] Filed: Apr. 22, 1991

[30] Foreign Application Priority Data

May 8, 1990 [IT] Italy .................. 67335 A/90

[51] Int. Cl.⁵ ...................... F01L 1/02; F16H 7/08
[52] U.S. Cl. .................. 123/90.31; 474/110; 474/111
[58] Field of Search ............. 123/90.31; 474/110, 474/111, 138, 117

[56] References Cited

U.S. PATENT DOCUMENTS

| | | | |
|---|---|---|---|
| 4,521,208 | 6/1985 | Doveri | 123/90.31 |
| 4,713,043 | 12/1987 | Biedermann | 474/111 |
| 4,715,333 | 12/1987 | Oyaizu | 123/90.31 |
| 4,726,331 | 2/1988 | Oyaizu | 123/90.31 |
| 4,874,352 | 10/1989 | Suzuki | 474/111 |

FOREIGN PATENT DOCUMENTS

| | | | |
|---|---|---|---|
| 1946651 | 9/1969 | Fed. Rep. of Germany | 474/111 |
| 3741860 | 6/1989 | Fed. Rep. of Germany | 123/90.31 |

Primary Examiner—E. Rollins Cross
Assistant Examiner—Weilun Lo
Attorney, Agent, or Firm—Sughrue, Mion, Zinn, Macpeak & Seas

[57] ABSTRACT

The chain for transmitting the drive between two overhead camshafts of a combustion engine for motor vehicles has an associated tensioning device comprising a rod-like support body fixed to the head in a position offset from the plane of the chain and a bush which can slide coaxially on the rod and is formed with a bracket carrying a shoe in sliding pressure contact with a free pass of the chain. The tensioning device incorporates means for automatically taking up the play between the shoe and the chain, including frictional axial positioning means between the bush and the rod for enabling the braked sliding of the former relative to the latter under the action of resilient and hydraulic thrust means.

8 Claims, 5 Drawing Sheets

INTERNAL COMBUSTION ENGINE WITH A TENSIONER FOR THE TRANSMISSION CHAIN BETWEEN TWO OVERHEAD CAMSHAFTS

DESCRIPTION

The present invention relates to internal combustion engines for motor vehicles with two overhead camshafts carrying at one end respective sprockets around which passes a chain for transmitting the drive from one shaft to the other, and a tensioning device including a shoe in sliding pressure contact with a free pass of the transmission chain.

In engines of this type, given the fact that the two camshafts are very close together, the space available between the respective transmission sprockets is very limited and this makes it difficult to fit the chain tensioner in that region, although this would be desirable, for reasons of bulk, in order to prevent its projection from the engine head.

The object of the present invention is to resolve this problem with an engine of the type defined above, in which the arrangement of the tensioning device for the transmission chain between the two camshafts is very compact and its functional configuration is highly effective in taking up the play which results, in operation, from the slackening and extension of the transmission chain.

According to the invention, this object is achieved by virtue of the fact that the tensioning device comprises a rod-like support body fixed to the head in a position which is offset laterally from the general plane of the sprockets and the chain, a bush which slides coaxially on the rod and is formed with a cantilevered bracket which projects between the two sprockets and carries the shoe, thrust means for urging the bush in a direction such that the shoe comes into contact with the chain, and means for automatically taking up the play between the shoe and the chain, including frictional axial positioning means between the bush and the rod for enabling the braked sliding of the former relative to the latter under the action of the thrust means.

In a preferred embodiment of the invention, the axial positioning means are of the stepwise type with one-way snap-retention.

The thrust means conveniently comprise a resilient member and a hydraulic system which is supplied with fluid from the engine-lubricating circuit when the engine is running.

Figure 4:
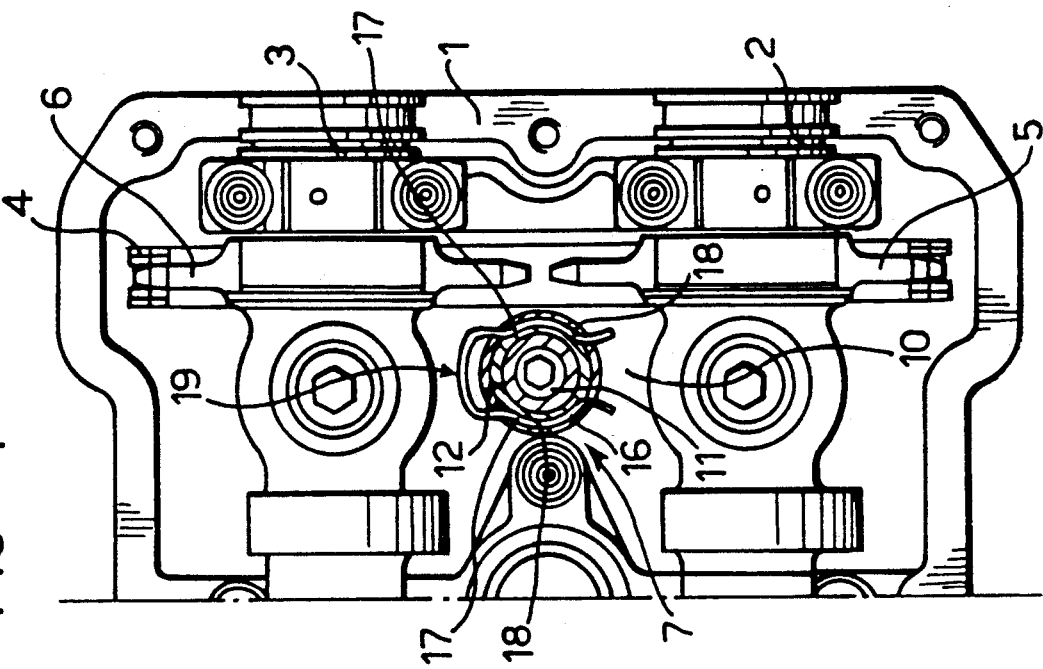
Figure 2:
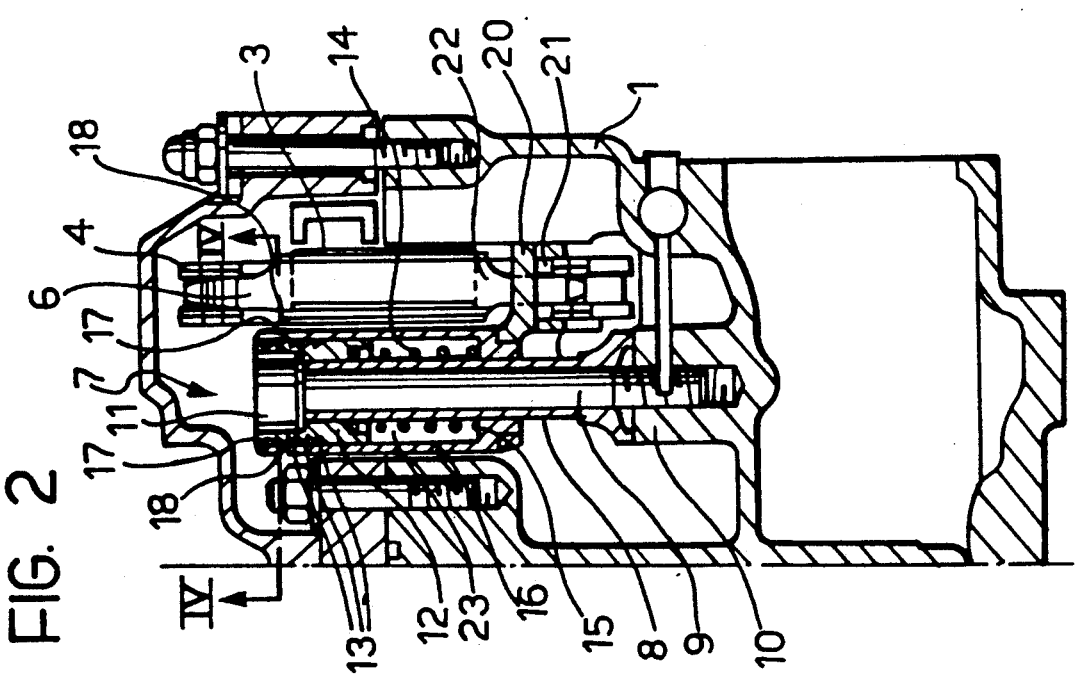
Figure 3:
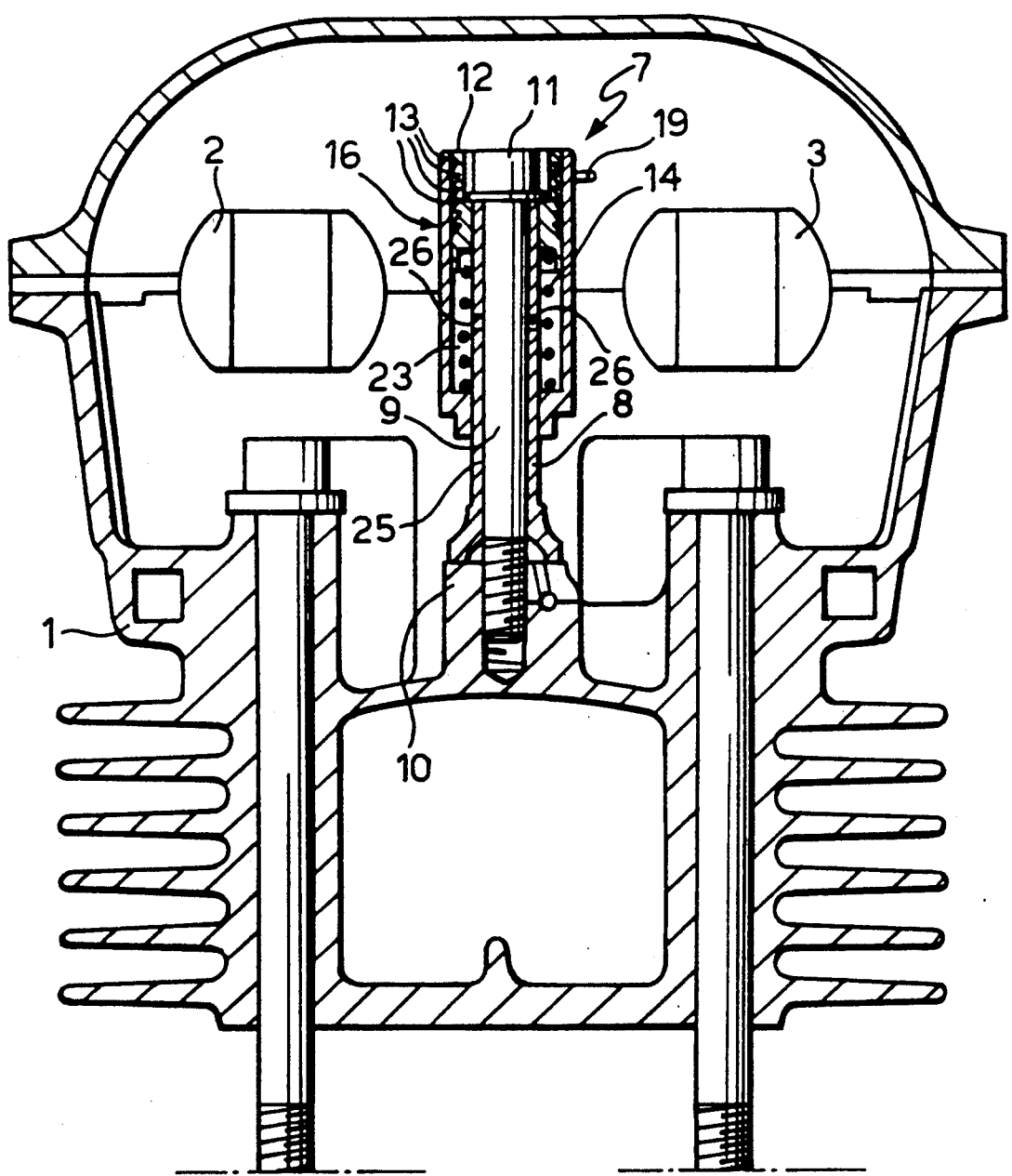
Figure 5:
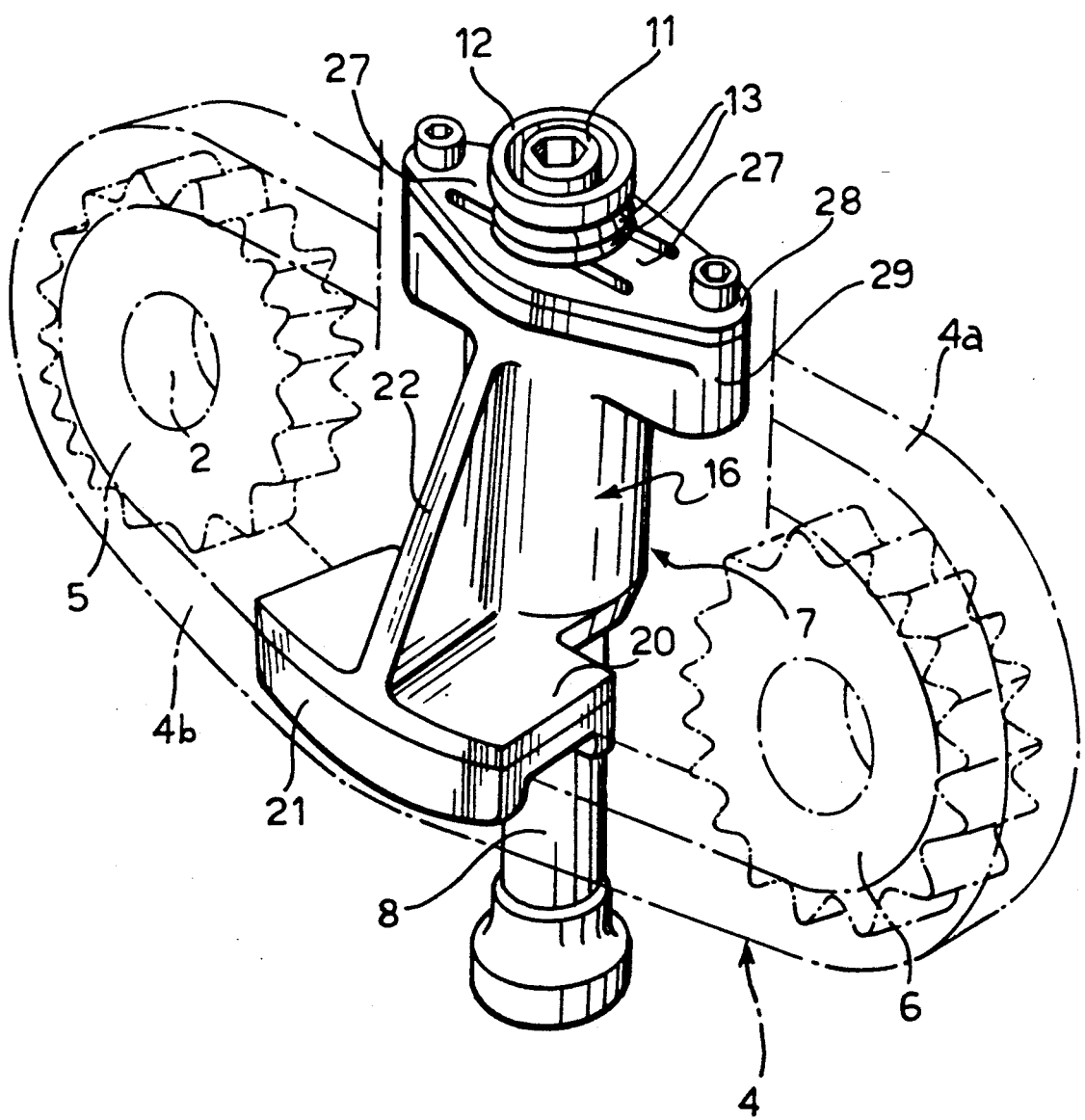
Figure 6:
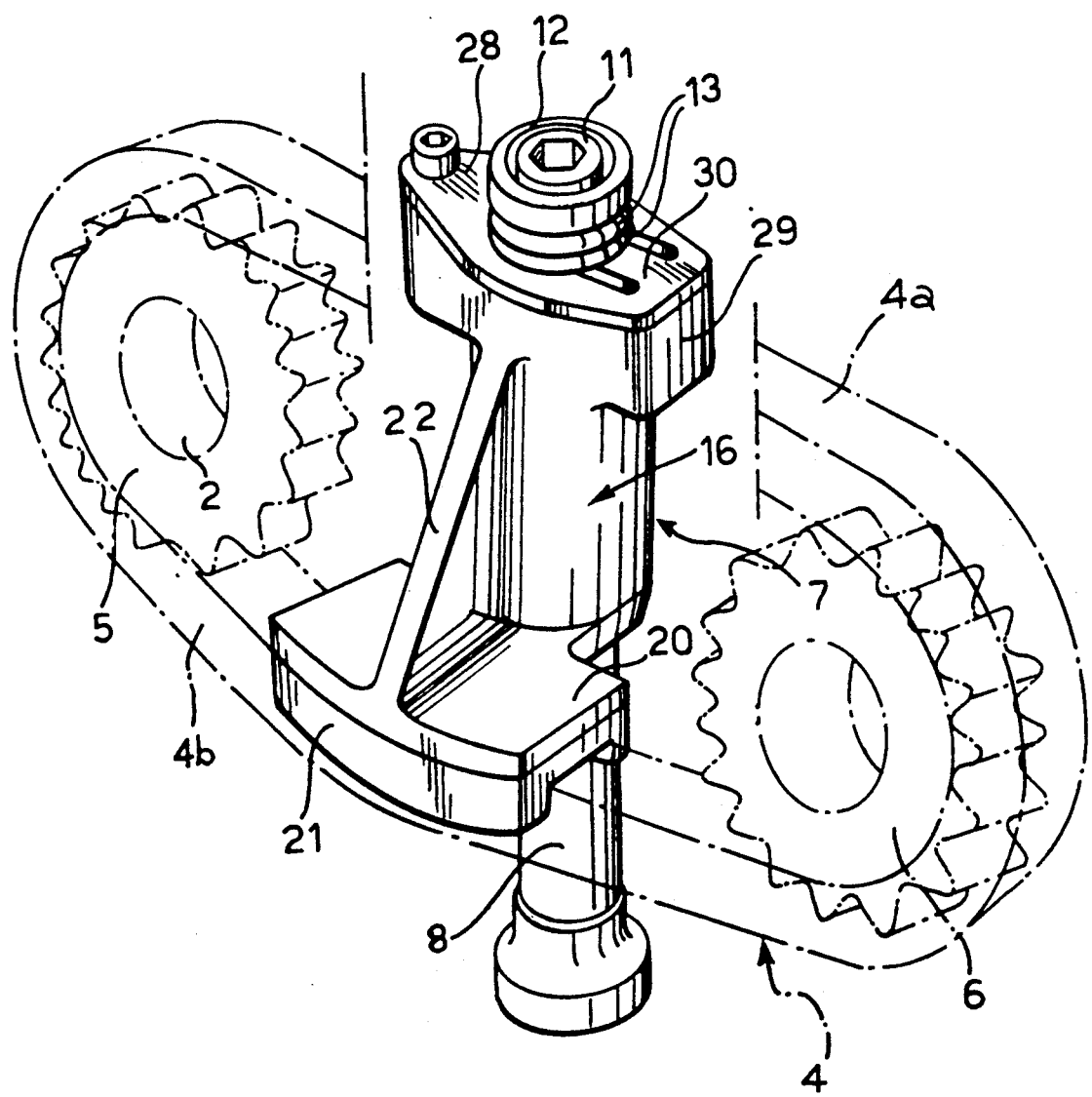

The invention will now be described in detail with reference to the appended drawings, provided purely by way of non-limiting example, in which:

FIG. 1 is a partially-sectioned schematic perspective view showing one end of the head of an internal combustion engine for motor vehicles according to the invention, FIG. 2 is a vertical section taken on the line II—II of FIG. 1, FIG. 3 is a vertical section taken on the line III—III of FIG. 1, FIG. 4 is a horizontal section taken on the line IV—IV of FIG. 2, FIG. 5 shows a first variant of FIG. 1, FIG. 6 shows a second variant of FIG. 1.

With reference initially to FIGS. 1 to 4, the head of an internal combustion engine for motor vehicles is generally indicated 1 and, in conventional manner, supports two parallel camshafts 2, 3 for rotation, one of which is rotated by the driving shaft, also in conventional manner, by means of a belt or chain, not shown.

The two camshafts 2, 3 are interconnected for rotation by means of a transmission chain 4 which passes around two sprockets 5, 6 keyed to one end of each shaft 2, 3 at one end of the head 1.

A tensioning device, generally indicated 7, is operatively associated with the transmission chain 4.

The tensioning device 7 includes a tubular support rod 8 through which is inserted a fixing screw 9 which is fixed to the head 1 in a central region 10 offset laterally from the general plane of the two sprockets 5, 6 and the chain 4 and facing the upper and lower free passes 4a and 4b of the chain 4.

At its upper end, the screw 9 has a head 11 against which a sleeve 12, coaxial with the tubular support 8 and having an outer surface formed with circumferential saw teeth 13, bears from below. The sleeve 12 is urged axially against the head 11 by the action of a helical compression spring 14 which is coaxial with the tubular rod 8 and acts at its lower end against the base wall 15 of a bush 16 which is also coaxial with the tubular rod 8 and surrounds the sleeve 12. In the embodiment of FIGS. 1 to 4, the bush 16 has two diametrally opposite lateral slots 17 in which the arms 18 of a substantially U-shaped spring 19 are engaged. These arms 18 cooperate with the teeth 13 of the sleeve 12 to achieve the frictional axial positioning of the bush 16 relative to the sleeve 12, enabling the braked sliding of the former in one direction relative to the latter in steps with a snap movement, as will be explained below.

A bracket 20 fixed to the base wall 12 of the bush 16 projects between the two sprockets 5, 6 and carries a shoe 21 which is in sliding pressure contact with the lower free pass 4b of the chain 4. The bracket 20 is connected to the side wall of the bush 16 by means of a reinforcing rib 22.

An internal annular thrust chamber 23 housing the spring 14 is defined between the sleeve 12 and the base wall 15 of the bush 16 and communicates with the engine-lubricating circuit 24 through an axial duct 25 defined between the tubular rod 8 and the fixing screw 9 and radial ducts 26 formed in the wall of the tubular rod 8.

In operation, the shoe 21 is urged into contact with the free pass 4b of the chain 4 by the thrust of the spring 14 which, as stated, tends to push the bush 16 downwardly. The coupling between the spring 19 and the teeth 13 of the sleeve 12 automatically takes up the play between the shoe 21 and the free pass 4b resulting from the slackening or extension of the chain 4. The spring 19 and the teeth 13 are shaped such that, when the bush 16 moves downwardly relative to the sleeve 12, it is prevented from returning to its original position.

When the engine is running, the action of the spring 14 is augmented by the hydraulic thrust of the lubricant supplied to the chamber 23 through the ducts 25 and 26.

It will be clear from the above description that, by virtue of the conformation defined above, and particularly the cantilevered structure of the block 21, the arrangement of the compensation device 7 is such as to ensure maximum functional effectiveness with a small size so that it does not extend beyond the end of the head 1.

The variants shown in FIGS. 5 and 6 are generally similar to the embodiment described above and only the differences will be described in detail with the use of the same reference numerals for identical or similar parts.

In the case of FIG. 5, the spring 19 is omitted and the snap-positioning of the bush 16 relative to the sleeve 12, and hence to the tubular rod 8, is achieved by a pair of opposing, radial sprung blades 27 between a pair of slots formed in a cover 28 fitted to an enlarged upper part 29 of the bush 16.

In the case of FIG. 6, the cover 28 is formed with a single radial sprung blade 30.

In both cases, the blades 27 or 30 interact with the teeth 13 of the sleeve 12 in a similar manner to the side arms 18 of the spring 19 in the embodiment of FIGS. 1 to 4.

Naturally, the details of construction and forms of embodiment may be varied widely with respect to those described and illustrated, without thereby departing from the scope of the present invention.

I claim:

1. An internal combustion engine for motor vehicles having a cylinder head, two overhead camshafts carrying at one end respective sprockets, a chain passing around said sprockets for transmitting the drive from one shaft to the other, said chain having a free pass and defining with said sprocket a general plane, and a tensioning device including a shoe in sliding pressure contact with the free pass of the transmission chain, wherein the tensioning device comprises a rod-like support body fixed to the head in a position which is offset laterally from the general plane of the sprockets and the chain, a bush which slides coaxially on the rod and is formed with a cantilevered bracket which projects between the two sprockets and carries the shoe, thrust means for urging the bush in a direction such that the shoe comes into contact with the chain, and means for automatically taking up the play between the shoe and the chain, including frictional axial positioning means between the bush and the rod for enabling unidirectional sliding of the bush relative to the rod under the action of the thrust means.

2. An engine according to claim 1, wherein the axial positioning means are of the stepwise type with one-way snap-retention.

3. An engine according to claim 2, wherein a sleeve interposed between the rod and the bush is fixed to the rod and has a toothed outer wall which cooperates with a resilient retaining member carried by the bush.

4. An engine according to claim 3, wherein the thrust means comprise a compression spring which surrounds the rod and is interposed axially between the sleeve and the bush.

5. An engine according to claim 3, wherein an annular thrust chamber is defined between the sleeve and the bush and is connected to the engine-lubricating circuit through supply ducts formed in the rod.

6. An engine according to claim 3, wherein the resilient retaining member is constituted by a spring with two arms which are engaged in corresponding slots in the bush.

7. An engine according to claim 3, wherein the resilient retaining member is constituted by a sprung blade carried by the bush.

8. An engine according to claim 3, wherein the resilient retaining member is constituted by a pair of opposing radial sprung blades carried by the bush.

* * * * *